United States Patent Office
2,758,034
Patented Aug. 7, 1956

2,758,034
DRY SOLUBLE CASEIN MIX AND METHOD OF PREPARING SAME

Howard S. Elden, Clarence Center, N. Y., assignor to National Gypsum Company, Buffalo, N. Y.

No Drawing. Application November 2, 1951, Serial No. 254,644

10 Claims. (Cl. 106—146)

The present invention relates to a dry soluble casein mix which is rendered water soluble in the dry state by the inclusion of unstable ammonium salts with the precipitated casein.

Casein, the precipitated curd of milk, is used as a base for the preparation of a variety of products such as the so-called water paints, casein cements and so-called texture paints. In order to prepare the casein properly for use in the field of paints and cements, it is necessary to render the precipitated curd soluble. This is generally done by the employment of alkalis or alkaline salts or by subjecting the dry casein in closed containers to ammonia.

For many purposes, a wet mix or paste of previously solubilized casein is employed. For some purposes, however, a dry mix is greatly to be desired as in cements and texture paints. It has been suggested in such circumstances to incorporate alkalies with the dry ingredients and upon mixture with water, the casein is rendered soluble after a considerable period of time and then the slurry is ready for use.

In the process of dissolving casein it first swells, absorbing water, then when the soluble stage is reached it releases some of the water. This reaction makes the mixing qualities difficult when a dry mix containing alkalis is made into a slurry with water. The mass when water is initially added thereto, becomes stiff and crumbly and difficult to mix. After standing about 30 minutes the casein starts to dissolve and the mass of cement "lets down" to a plastic mix. The presence of unstable or fugitive ammonium salts in the dry mix hastens the swelling and dissolving rate to such an extent that the swelling stage is not as apparent, so that the wet mass possesses easier mixing qualities and a very short mixing time is required. Cements and textures made with ammonium salts possess a relatively long working time as compared with such materials made with other alkalis. Thus sodium salts and lime readily dissolve casein but the lime reacts with the casein forming insoluble calcium caseinate and the resulting cement or texture paint deteriorate rapidly and soon loses its adhesive qualities.

It is an object of the present invention to provide a dry mix incorporating casein as the binder, which mix is suitable for use as a paint or cement.

It is also an object of the invention to prepare a dry mix wherein precipitated casein is packaged with a powdered ammonium salt and wherein the casein is rendered soluble in the pacakage in contact with said salt.

It is also an object of the invention to provide a casein mix suitable for use as a paint or cement but which mix is not in paste form and yet contains solubilized casein.

It is also an object of the present invention to provide a dry mix containing solubilized casein which by reason of its change from curd to soluble form is readily and easily mixed with water to produce a uniform slurry.

It is also an object of the invention to provide a dry casein mix which when mixed with water is ready for use in a matter of minutes.

In accordance with the present invention, commercial casein curd, that is, casein which has been precipitated from skim milk by the employment of various acids as precipitating agents as, for instance, lactic acid, sulfuric acid or hydrochloric acid, is ground, mixed and blended with a sufficient amount of a dry, solid, unstable ammonium salt whereby a pH in the resultant mix of about 6.0 to 9 results. The ammonium salt preferred is the so-called ammonium biborate $(NH_4)_2B_4O_7 4H_2O$; the amount of the ammonium biborate, the preferred ammonium salt required to give the desired alkalinity in the casein will depend upon the history and origin of the casein being treated, that is, whether the casein has been precipitated by a strong acid such as sulfuric acid or muriatic acid or whether by a weak acid, and the degree to which the casein retains occluded acid or acid which has not been washed from the casein after precipitation.

As a general rule, the minimum amount of ammonium biborate or other ammonium salt required is about 7.5% based on the weight of casein with which it is mixed but this minimum may vary from 5% to about 10%.

At the end of about 24 hours in contact, the casein will be found to possess those characteristics which designate it as so-called soluble casein. Instead of the ammonium biborate, other fugitive or unstable ammonium salts are suitable as, for instance, ammonium carbonate or ammonium bicarbonate. These latter salts, however, possess certain disadvantages in use as compared to the biborate, due to the relatively strong odor of ammonia normally associated with them and, therefore, the ammonium biborate is preferred in the preparation of the dry cements and paints of the present invention. It will be understood, however, that the ammonium salts of carbonic acid are operable.

At the time of formulating the casein-ammonium salt mix it will probably be found convenient to incorporate fillers, extenders and pigments if desired, as for instance, whiting or ground limestone, asbestos fiber, mica and the like, as well as the usual fungicides and preservatives. The resultant product may be packaged immediately after blending and during the first approximately 24 hours, that is, during shipment or warehousing, the casein in the dry mix of cement or paint will react slowly with the ammonia liberated from the fugitive ammonium salt and produce an end pH in the casein of from about 6.0 to 9 thus rendering the casein soluble so that when water is added to the dry mix, a creamy casein paste results which, depending upon the amount of water added, may be used, for instance, as a texture paint generally having included therein a desired pigmenting material or as a cement.

Only those ammonium salts are operable, in the present invention, which are classed as the fugitive ammonium salts, that is those which liberate ammonia spontaneously. Thus ammonium carbonate $(NH_4)_2CO_3$ decomposes spontaneously into 2 molecules of ammonia, 1 molecule carbon dioxide and 1 molecule of water.

Ammonium biborate is believed to decompose spontaneously and reversibly as follows:

$$(NH_4)_2B_4O_7 \rightleftarrows NH_3 + NH_4HB_4O_7$$

Therefore, upon mixing a fugitive ammonium salt with raw casein, the pH of which is generally in the neighborhood of 4 to 5 or less, the casein absorbs the liberated ammonia, reacts therewith and is changed to a soluble akali casein, the pH of which is generally 6 or higher. In addition to the ability to liberate ammonia, the fugitive ammonium salt must be employed in sufficient quantity to provide enough ammonia for the quantity of casein to be treated.

The following table sets forth the solubilization and end pH resultant after 24 hours dry storage of twenty grams of 4.08 pH casein and respectively .5, 1.0, 1.5 and 2.0 grams of each of the disclosed fugitive ammonium salts, ammonium biborate, ammonium carbonate, and ammonium bicarbonate, said solubilization and end pH being obtained after addition of water to the respective dry mixtures in the ratios of 6 ml. water/gm. of dry mixture.

Table 1

[Solubility and pH of water mixtures after 24 hrs. dry aging. Dry mixture to water ratio: 6 ml. water/gm. dry mixture.]

| Grams Ammonium Salt per 20 gms. Casein | Ammonium Biborate $(NH_4)_2B_4O_7$ | | Ammonium Carbonate $(NH_4)_2CO_3$ | | Ammonium Bicarbonate $(NH_4)HCO_3$ | |
|---|---|---|---|---|---|---|
| | Solubility | pH | Solubility | pH | Solubility | pH |
| 0.5 | Not soluble | 5.4 | Not soluble | 5.8 | Not soluble | 5.8 |
| 1.0 | ----do---- | 5.7 | Soluble | 6.7 | Soluble | 6.3 |
| 1.5 | Partially Thickened | 5.9 | ----do---- | 7.1 | ----do---- | 6.9 |
| 2.0 | Soluble | 6.5 | ----do---- | 7.5 | ----do---- | 7.3 |

From the above table it will be noted that the consistency of the casein changes from that of a curd to a thickened dispersion capable of film formation at about pH 6.0 and that the minimum amount of fugitive ammonium salt required to cause this change ranges from under 5% in the case of ammonium bicarbonate to about 7.5% in the case of ammonium biborate.

Typical formulations of casein textures and casein cement are as follows:

| | Texture Paint | Cement |
|---|---|---|
| Casein | 8.7 | 8.7 |
| Ammonium Biborate | 1.3 | 1.3 |
| Asbestos | 14.0 | 10.0 |
| Clay | 14.0 | 15.0 |
| Mica | 26.0 | 15.0 |
| Limestone | 36.0 | 50.0 |

Both texture paint and cement may be prepared from other fugitive ammonium salts as, for instance, ammonium bicarbonate or ammonium carbonate by replacing some or all of the ammonium biborate with such other fugitive ammonium salt. The amount of the fugitive salt is that quantity which will produce in the casein a pH of greater than pH 6. It will be noted in the above typical formulations that approximately 15% of ammonium biborate, based on the weight of casein is incorporated. This percentage is in excess of the 7.5% necessary to produce a pH of 6.0 in the aged and water mixed solution.

It will be understood that the above formulation is given merely as illustrative, as the quantities and types of aggregate may be varied quite widely depending upon the properties desired in the end product. After standing in the dry state for a period of about 24 hours or more, the dry mix may be gauged with water and stirred and, in a few minutes, a creamy mix is obtained which will harden when exposed to air as in a film, due to the evaporation of water. The amount of water to be mixed will vary depending upon the use to which the formulation is to be put and to its composition but, in general, about one pint of water is added to one pound of the formulation, although this may vary from about ½ pint to a little over 1 pint depending upon the consistency desired.

What is claimed is:

1. A packaged dry mix, suitable for use upon admixture of water as a paint or cement, containing as essential ingredients dry casein and a sufficient amount of a fugitive ammonium salt and the decomposition products of said salt to produce a dry mix which has a pH of 6.0 to 9.0 when sufficient water is added to produce a workable paste consistency.

2. A packaged dry mix, suitable for use upon admixture of water as a paint or cement, containing as essential ingredients soluble ammonium caseinate and the decomposition products of a fugitive ammonium salt, said decomposition products being of such quantity as would be formed from sufficient fugitive ammonium salt to produce a dry mix which has a pH of 6.0 to 9.0 when sufficient water is added to produce a workable paste consistency.

3. A packaged dry mix, as in claim 1, wherein the fugitive ammonium salt is ammonium biborate.

4. A packaged dry mix, as in claim 1, wherein the fugitive ammonium salt is ammonium bicarbonate.

5. A packaged dry mix, as in claim 1, wherein the fugitive ammonium salt is ammonium carbonate.

6. The method of producing a dry mix suitable for use upon admixture of water as a paint or cement which comprises enclosing together a dry insoluble casein and a fugitive ammonium salt, and permitting said casein and said salt to remain enclosed together in a substantially dry condition for a period of at least 24 hours, said fugitive ammonium salt being provided in sufficient quantity to produce a dry mix which, after said 24 hours and upon addition of sufficient water to produce a workable paste, has a pH of from 6.0 to 9.0.

7. The method of producing a dry mix, suitable for use upon admixture of water as a paint or cement, which comprises enclosing together a mixture of a dry insoluble casein and a fugitive ammonium salt, and permitting said casein and said salt to remain enclosed together in a substantially dry condition for a period of at least 24 hours, said fugitive ammonium salt being provided in sufficient quantity to produce a dry mix which, after said 24 hours and upon addition of sufficient water to produce a workable paste, has a pH of from 6.0 to 9.0.

8. The method of claim 7 wherein the fugitive ammonium salt is ammonium biborate.

9. The method of claim 7 wherein the fugitive ammonium salt is ammonium bicarbonate.

10. The method of claim 7 wherein the fugitive ammonium salt is ammonium carbonate.

References Cited in the file of this patent

UNITED STATES PATENTS

| | | |
|---|---|---|
| 586,854 | Majert | July 20, 1897 |
| 623,541 | Hall | Apr. 25, 1899 |
| 717,085 | Dunham | Dec. 30, 1902 |
| 868,445 | Just | Oct. 15, 1907 |
| 2,228,158 | Teale | Jan. 7, 1941 |
| 2,356,795 | Poarch | Aug. 29, 1944 |
| 2,377,624 | Gordon | June 5, 1945 |

OTHER REFERENCES

"The Manufacture of Casein for Adhesives, Cement and Paints," Butcher—The Industrial Chemist, vol. 1, No. 3, June 1925; page 251.

"Casein, Its Preparation, Chemistry and Technical Utilization," Tague—D. Van Nostrand Co., N. Y., copyright 1926; pages 30, 31.

"Casein and Its Industrial Applications," Surmeister et al.—second ed., Reinhold Pub. Corp., N. Y., 1939; pages 147 and 341.